United States Patent
He et al.

(10) Patent No.: US 6,201,719 B1
(45) Date of Patent: Mar. 13, 2001

(54) CONTROLLER FOR POWER SUPPLY AND METHOD OF OPERATION THEREOF

(75) Inventors: Jin He, Plano; Mark E. Jacobs, Dallas, both of TX (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/469,693

(22) Filed: Dec. 22, 1999

(51) Int. Cl.[7] ........................................... H02M 7/00
(52) U.S. Cl. ................................. 363/72; 363/98
(58) Field of Search ........................... 323/207; 363/17, 363/98, 720, 71, 136

(56) References Cited

U.S. PATENT DOCUMENTS 5,121,314 * 6/1992 Cathell et al. ..................... 363/17

OTHER PUBLICATIONS

"Full–Load–Range–ZVS Hybrid DC–DC Converter with Two Full–Bridges for High–Power Battery Charging" by Rajapandian Ayyanar and Ned Mohan: 1999 IEEE; 8 pg. No Page #'s No Month.

"A Novel Soft–Switching DC–DC Converter with Wide ZVS–Range and Reduced Filter Requirement" by Rajapandian Ayyanar and Ned Mohan: 1999 IEEE; pp. 433–438. No Month.

"A Novel Soft–Switching Converter with Reduced Filter Requirement" by Rajapandian Ayyanar and Ned Mohan: Sep. 1998 Workshop Presentation: 20 pg. No Page #'s.

* cited by examiner

*Primary Examiner*—Shawn Riley

(57) ABSTRACT

A controller for a full bridge power converter having controllable switches, a method of operating the controller and a power supply employing the controller or the method. In one embodiment, the controller includes (1) a signal generator circuit designed to drive the controllable switches in a phase-shifted mode and (2) a switching network, coupled to the signal generator circuit, adapted to enable the signal generator circuit to operate the converter in an alternative one of (2a) the phase-shifted mode, wherein the controllable switches in each of first and second legs of the converter are complementarily switched, the signal generator circuit capable of adjusting a relative phase between the first and second legs and (2b) a normal mode, wherein diagonal pairs of the controllable switches are switched substantially simultaneously and at a substantially full duty cycle.

21 Claims, 3 Drawing Sheets

CONTROLLER FOR POWER SUPPLY AND METHOD OF OPERATION THEREOF

CROSS-REFERENCE TO RELATED APPLICATIONS AND PATENTS

This application is related to U.S. patent application Ser. No. 09/401,728, entitled "Phase-Shifted Post-Regulator, Method of Operation Thereof and Power Converter Employing the Same," to He, et al., filed on Sep. 22, 1999. The above-listed application is commonly assigned with the present invention and is incorporated herein by reference as if reproduced herein in its entirety.

TECHNICAL FIELD OF THE INVENTION

The present invention is directed, in general, to power conversion and, more specifically, to a controller for a power supply and method of operation thereof.

BACKGROUND OF THE INVENTION

The development of more efficient and lower noise power converters is a continuing goal in the field of power electronics . Power converters are typically employed in applications that require conversion (with isolation) of an input DC voltage to various other DC voltages, higher or lower than the input DC voltage. Examples include telecommunication and computer systems wherein high voltages are converted to lower voltages to operate the systems. Power converters often suffer from problems such as switching losses, switching noise and common-mode noise originating in the power transformer. Switching losses reduce system efficiency, resulting in greater input power requirements for the same output power. Switching and common-mode transformer noise, both conducted and radiated, require filtering to prevent or reduce interference with other sensitive electronic equipment.

Current power converter designs often implement one of two full bridge control strategies, namely, the conventional hard-switched, pulse-width modulated full bridge or the phase-shifted full bridge. Both control strategies employ a full bridge inverter topology having four controllable switches (e.g., power metal-oxide semiconductor field-effect transistors), an isolation transformer, an output rectifier and an output filter. The full-bridge inverter topology, with either control strategy, benefits from body diodes or separately added diodes antiparallel to the four controllable switches to accommodate currents in the parasitic inductances of the isolation transformer. A controller is included and employed to control the controllable switches.

The conventional full bridge generally operates as follows. The controllable switches are arranged in two diagonal pairs that are alternately turned on for a portion of a switching period to apply opposite polarities of the input DC voltage across a primary winding of the isolation transformer. The controllable switches thus operate to convert the input DC voltage into an AC voltage to operate the isolation transformer. Between conduction intervals of the diagonal pairs, all of the controllable switches are turned off for a fraction of the switching period. Ideally, this should force a voltage across the primary winding of the isolation transformer to zero. The output rectifier then rectifies the AC voltage from the isolation transformer. A rectified voltage of the isolation transformer should, therefore, ideally be a square wave with an average value proportional to a duty ratio of the diagonal pairs of controllable switches.

The output filter smooths and filters the rectified voltage to provide a substantially constant output voltage at the output of the power converter. The controller monitors the output voltage and adjusts the duty ratio of the diagonal pairs of controllable switches to maintain the output voltage at a constant level as the input DC voltage and the load current vary.

In practice, the rectified voltage is not a perfect square wave, however, because turning off all of the controllable switches induces a ring between a leakage inductance of the isolation transformer and a parasitic capacitance of the controllable switches. The ringing dissipates energy, thereby reducing the efficiency of the power converter. The ringing also gives rise to significant noise, such as conducted and radiated electromagnetic interference. In addition, current in the magnetizing inductance of the transformer should be reset, which is generally accommodated by the antiparallel diodes of the controllable switches.

The phase-shifted full bridge was developed to alleviate some switching loss and switching noise problems of the conventional full bridge. The construction of a power train of the phase-shifted full bridge is substantially similar to that of the conventional full bridge. Its advantages result, however, from the operation of the controllable switches to produce a substantially zero or reduced voltage across the controllable switches before the controllable switches are turned on. The phase-shifted full bridge operates by initially turning on both controllable switches of a diagonal pair (e.g., the top left and the lower right controllable switch). The phase-shifted full bridge may then turn off one controllable switch of the diagonal pair (e.g., the lower right switch) to begin the zero voltage period, instead of turning off both of the controllable switches. A controllable switch from the same leg (e.g., the upper right switch) is then turned on, allowing the current in the primary circuit to circulate through the two controllable switches with substantially zero or reduced voltage across the isolation transformer.

The two controllable switches thus clamp the voltage across the isolation transformer at about zero, thereby substantially eliminating the ringing behavior suffered by the conventional full bridge when the controllable switches are turned off. By clamping both ends of the primary winding of the isolation transformer to one rail and then, to the other rail, however, the phase-shifted full bridge induces a current flow through an intrinsic primary-to-secondary capacitance of the isolation transformer. As a capacitor potential is alternately charged from rail to rail, a common-mode noise is generated.

Furthermore, alternately circulating the primary current through the two top or bottom controllable switches may result in additional conduction losses. During the circulation intervals of the primary current, both the input current to the bridge and the output voltage applied to the output filter are substantially zero, requiring both input and output filtering.

An efficient application of the full bridge topology employs an unregulated full bridge operating at a substantially full duty cycle, with substantially simultaneous switching of the diagonal pairs of switches to provide reduced electromagnetic interference. The full bridge is followed by a post-regulator having a full range of regulation. To accommodate start-up and overload conditions, it may be necessary to operate the full bridge as a phase-shifted bridge.

Commonly used control integrated circuits, which are useful for providing phase-shifted operation, generally exhibit a number of critical limitations that complicate their use with full bridge topologies. The control integrated circuits are often unable to accurately provide full duty cycle operation. Further, the control integrated circuits may also be unable to provide substantially simultaneous switching of the diagonal switches of the full bridge when full duty cycle operation is required.

Accordingly, what is needed in the art is a controller for a power supply that overcomes the limitations of the prior art.

SUMMARY OF THE INVENTION

To address the above-discussed deficiencies of the prior art, the present invention provides a controller for a full bridge power converter having controllable switches, a method of operating the controller and a power supply employing the controller or the method. In one embodiment, the controller includes (1) a signal generator circuit designed to drive the controllable switches in a phase-shifted mode and (2) a switching network, coupled to the signal generator circuit, adapted to enable the signal generator circuit to operate the converter in an alternative one of (2a) the phase-shifted mode, wherein the controllable switches in each of first and second legs of the converter are complementarily switched, the signal generator circuit capable of adjusting a relative phase between the first and second legs and (2b) a normal mode, wherein diagonal pairs of the controllable switches are switched substantially simultaneously and at a substantially full duty cycle.

The present invention, in one aspect, introduces the broad concept of switching the outputs of a signal generator circuit that is designed to drive the controllable switches of the full bridge power converter in a phase-shifted mode to allow the signal generator circuit to drive the controllable switches in both the phase-shifted mode and the normal mode. Commonly available signal generator circuits designed for phase-shifted operation are generally unable to accurately provide substantially simultaneous switching of diagonal pairs of the full bridge power converter. Further, the commonly available signal generator circuits are unable to accurately provide full duty cycle switching of the controllable switches. The controller of the present invention thus employs the switching network to couple the outputs of the signal generator circuit to appropriate ones of the controllable switches to enable the signal generator circuit to alternatively operate the converter in the phase-shifted mode and the normal mode.

In one embodiment of the present invention, the signal generator circuit is embodied in an integrated circuit. The signal generator circuit may be one of a number of control integrated circuits produced by Unitrode Integrated Circuits Corp of Merrimack, N.H., such as a type 3875 or a type 3879 control integrated circuit. Of course, the signal generator circuit need not be embodied in an integrated circuit.

In one embodiment of the present invention, the signal generator circuit is adapted to provide pulse-width modulated outputs employable to drive respective ones of the controllable switches. Those skilled in the pertinent art are familiar with pulse-width modulation techniques.

In one embodiment of the present invention, the switching network includes at least one bi-directional switch. In an embodiment to be illustrated and described, the switching network advantageously includes four bidirectional switches. Bidirectional switches may be implemented by coupling two unidirectional switches, such as field effect transistors, back to back. Of course, other types of bi-directional switches are well within the broad scope of the present invention.

In one embodiment of the present invention, the switching network switches to couple at least one output of the signal generator circuit to at least two of the controllable switches to enable the signal generator circuit to operate the converter in the normal mode. The signal generator circuit may thus drive the controllable switches substantially simultaneously.

In one embodiment of the present invention, the converter is operated in the phase-shifted mode during start-up. The converter may then be transitioned to the normal mode after start-up to reduce common-mode noise.

In one embodiment of the present invention, the converter is operated in the phase-shifted mode during a fault condition, e.g., an overload condition. A fault condition, such as a low impedance load accidentally connected across the output may occur. Under such conditions, the full bridge power converter may be temporarily operated in the phase-shifted mode until the fault is removed. Of course, the converter may also be operated in the phase-shifted mode at other times as may be desired.

In one embodiment of the present invention, the controller further includes at least one gate drive transformer coupled between the signal generator circuit and one of the controllable switches. In a related embodiment, each gate drive transformer may be adapted to drive two of the controllable switches. In an embodiment to be illustrated and described, the controller employs two gate drive transformers, each adapted to drive one leg of the full bridge power converter.

The foregoing has outlined, rather broadly, preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
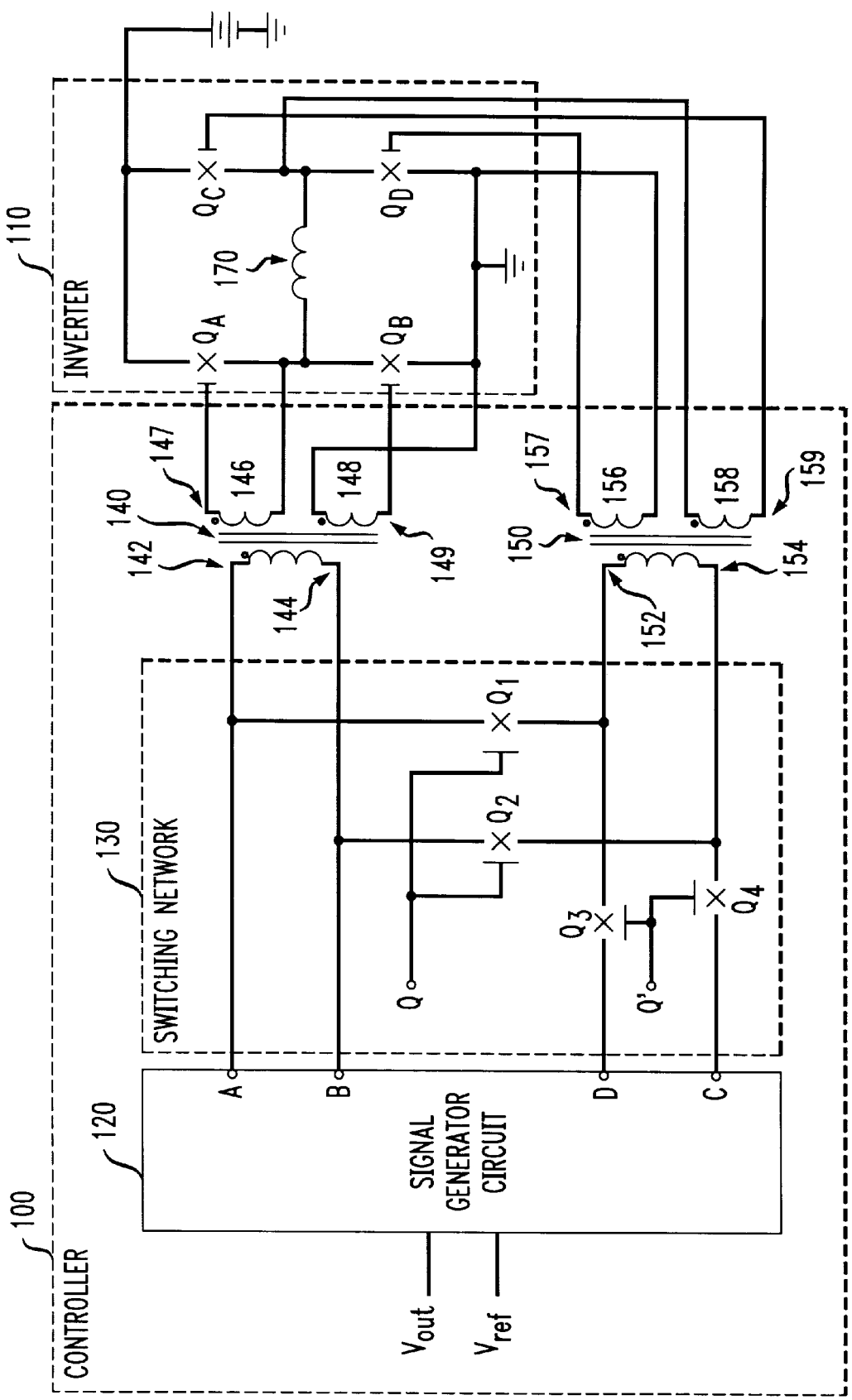
FIG. 1 illustrates a schematic diagram of an embodiment of a controller constructed according to the principles of the present invention.

Referring initially to FIG. 1, illustrated is a schematic diagram of an embodiment of a controller 100 constructed according to the principles of the present invention. The controller 100 is designed for use with a full bridge power converter (inverter) 110 having first, second, third and fourth controllable switches $Q_A$, $Q_B$, $Q_C$, $Q_D$ coupled across a primary winding 170 of a power transformer. The power converter 110 further has a secondary circuit (not shown), which will be familiar to those skilled in the pertinent art.

In the illustrated embodiment, the controller 100 includes a signal generator circuit 120 coupled to an output of the power converter 110. The signal generator circuit 120 receives an output signal Vout representing an output characteristic (e.g., the output voltage or a combination of the output voltage and a signal representing the output current) of the power converter 110 and a reference signal Vref representing a reference characteristic (e.g., a voltage desired at the output). The signal generator circuit 120 compares the output signal Vout and the reference signal Vref and develops therefrom first, second, third and fourth pulse-width modulated output signals at first, second, third and fourth signal generator circuit outputs A, B, C, D designed to respectively drive the first, second, third and fourth controllable switches $Q_A$, $Q_B$, $Q_C$, $Q_D$ of the power converter 110 in a phase-shifted mode. The signal generator circuit 120 may be a commonly used control integrated circuit, such as a type 3875 or a type 3879 manufactured by Unitrode Integrated Circuits Corp. of Merrimac, N.H. Of course, other signal generator circuits, including those employing discrete components, are well within the broad scope of the present invention.

While the signal generator circuit 120 is able to drive the first, second, third and fourth controllable switches $Q_A$, $Q_B$, $Q_C$, $Q_D$ in the phase-shifted mode, the signal generator circuit 120 has two critical limitations. First, the signal generator circuit 120 may frequently be unable to accurately provide substantially full duty cycle operation. Second, the signal generator circuit 120 may frequently be unable to provide substantially simultaneous switching of diagonal pairs of the first, second, third and fourth controllable switches $Q_A$, $Q_B$, $Q_C$, $Q_D$.

The power converter 110, however, would benefit from the ability to operate in a normal mode, i.e., having diagonal pairs of its controllable switches driven substantially simultaneously and at a substantially full duty cycle. Those skilled in the pertinent art are aware of the benefits of normal mode operation, including lower common-mode noise, improved efficiency, smaller component sizes, low output voltage ripple and low input current ripple.

Since the signal generator circuit 120 may be unable to operate the full bridge power converter 110 in the normal mode, the controller 100 of the present invention advantageously includes a switching network 130, coupled to the signal generator circuit 120, that is adapted to enable the signal generator circuit 120 to operate the full bridge power converter 110 in alternative ones of the phase-shifted mode and the normal mode.

In the illustrated embodiment, the controller 100 further includes first and second gate drive transformers 140, 150. The first gate drive transformer 140 has a primary winding with a first primary terminal 142 coupled to the first signal generator circuit output A and a second primary terminal 144 coupled to the second signal generator circuit output B. The first gate drive transformer 140 further has first and second secondary windings 146, 148. The first secondary winding 146 has a first secondary terminal 147 coupled to a control terminal (e.g., gate) of the first controllable switch $Q_A$. The second secondary winding 148 has a second secondary terminal 149 coupled to a control terminal of the second controllable switch $Q_B$. In the illustrated embodiment, the first and second secondary terminals 147, 149 are opposite in polarity to enable the first and second controllable switches $Q_A$, $Q_B$ to be driven in a complementary manner. The first gate drive transformer 140 is thus adapted to provide drive signals to the first and second controllable switches $Q_A$, $Q_B$.

The second gate drive transformer 150 has a primary winding with a first primary terminal 152 coupled to the third signal generator circuit output C and a second primary terminal 154 coupled to the fourth signal generator circuit output D. The second gate drive transformer 150 further has first and second secondary windings 156, 158. The first secondary winding 156 has a first secondary terminal 157 coupled to a control terminal of the third controllable switch $Q_C$. The second secondary winding 158 has a second secondary terminal 159 coupled to a control terminal of the fourth controllable switch $Q_D$. In the illustrated embodiment, the first and second secondary terminals 157, 159 are opposite in polarity. The second gate drive transformer 150 is thus adapted to provide drive signals to the third and fourth controllable switches $Q_C$, $Q_D$. Those skilled in the pertinent art are familiar with gate drive transformers. For more information on gate drive transformers, refer to U.S. Pat. No. 5,481,219, issued Jan. 2, 1996, to Jacobs, et al., entitled "Apparatus and method for generating negative bias for isolated MOSFET gate-drive circuits," which is incorporated herein by reference.

In the illustrated embodiment, the switching network 130 includes first, second, third and fourth bi-directional switches Q1, Q2, Q3, Q4. While the illustrated embodiment depicts bi-directional switches, those skilled in the pertinent art realize that the bi-directional switches may be implemented in any number of ways, including coupling two uni-directional switches back to back. The first bi-directional switch Q1 is coupled between the first and fourth signal generator circuit outputs A, D. The second bi-directional switch Q2 is coupled between the second and third signal generator circuit outputs B, C. The third bi-directional switch Q3 is series-coupled between the fourth signal generator circuit output D and the first primary terminal 152 of the second gate drive transformer 150. The fourth bi-directional switch Q4 is series-coupled between the third signal generator circuit output C and the second primary terminal 154 of the second gate drive transformer 150.

In the illustrated embodiment, the first and second bi-directional switches Q1, Q2 are controlled by a logical control signal Q. The third and fourth bi-directional switches Q3, Q4 are controlled by an inverted logical control signal Q'. The inverted logical control signal Q' is ON when the logical control signal Q is OFF and vice versa. The logical control signal Q and the inverted logical control signal Q' may be provided, for instance, by a comparator that compares the output signal Vout and the reference signal Vref to determine the operating mode of the power converter 110. In the illustrated embodiment, the switching network 130 will switch to allow the signal generator circuit 120 to operate the power converter 110 in the normal mode when the logical control signal Q is high. Alternatively, when the logical control signal Q is low, the switching network 130 will switch to allow the signal generator circuit 120 to operate the power converter 110 in the phase-shifted mode.

The controller 100 operates as follows. When the logical control signal Q is high, indicating operation in the normal mode, the first and second bi-directional switches Q1, Q2 are ON to couple both the first and second gate drive transformers 140, 150 to the first and second signal generator circuit outputs A, B. The third and fourth bi-directional switches Q3, Q4 are OFF, decoupling the third and fourth signal generator circuit outputs C, D from the second gate drive transformer 150. The signal generator circuit 120 may thus provide the first pulse-width modulated output signal to the first and fourth controllable switches $Q_A$, $Q_D$ forming a first diagonal pair of controllable switches of the full bridge power converter 110. The signal generator circuit 120 may likewise provide the second pulse-width modulated output signal to the second and third controllable switches $Q_B$, $Q_C$ forming a second diagonal pair of controllable switches of the full bridge power converter 110. Since substantially the same pulse-width modulated output signal is provided to each of the first and second diagonal pairs, the first and second diagonal pairs may thus be switched substantially simultaneously. The signal generator circuit 120 may provide substantially full duty cycle switching to enable the full bridge power converter 110 to minimize common-mode noise.

When the logical control signal Q is low, indicating operation in the phase-shifted mode, the first and second bi-directional switches Q1, Q2 are OFF. The third and fourth bi-directional switches Q3, Q4 are ON to couple the third and fourth signal generator circuit outputs C, D to the second gate drive transformer 150. The first and second signal generator circuit outputs A, B are coupled to the first gate drive transformer 140. The first, second, third and fourth signal generator circuit outputs may thus respectively provide the first, second, third and fourth pulse-width modulated output signals to the first, second, third and fourth controllable switches $Q_A$, $Q_B$, $Q_C$, $Q_D$.

The switching network 130 may thus allow the signal generator circuit 120 to complementarily switch the controllable switches in first and second legs of the full bridge power converter 110. In the illustrated embodiment, the first leg of the full bridge power converter 110 includes the first and second controllable switches $Q_A$, $Q_B$. The second leg of the full bridge power converter 110 includes the third and fourth controllable switches $Q_C$, $Q_D$. The full bridge power converter 110 may thus operate in the phase-shifted mode, wherein a relative phase shift between the first and second legs of the full bridge power converter 110 is adjusted to control the output voltage thereof.

Figure 2:
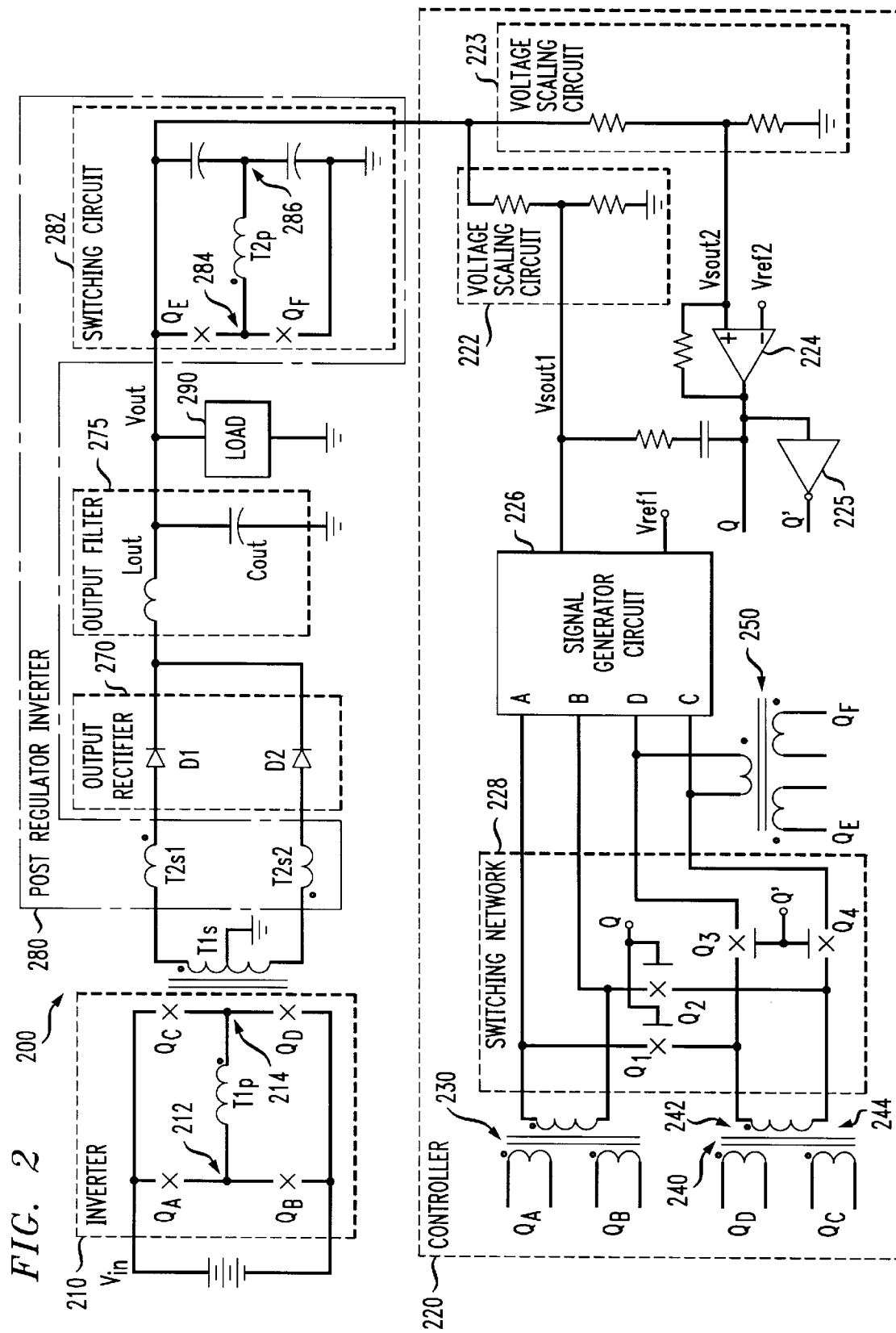
FIG. 2 illustrates a schematic diagram of an embodiment of a power supply employing a controller constructed according to the principles of the present invention.

Turning now to FIG. 2, illustrated is a schematic diagram of an embodiment of a power supply 200 employing a controller 220 constructed according to the principles of the present invention. The power supply 200 includes a full bridge inverter 210 coupled to an input of the power supply 200. The power supply 200 further includes an isolation transformer T1 having a primary winding T1p coupled to the inverter 210. The power supply 200 further includes an output rectifier 270, coupled to a secondary winding T1s of the isolation transformer T1, that rectifies a periodic waveform supplied by the isolation transformer T1. The power supply 200 further includes an output filter 275 coupled to the output rectifier 270. The output filter 275 filters the rectified waveform from the output rectifier 270 to supply an output voltage Vout to a load 290 at an output of the power supply 200. The power supply 200 further includes a post-regulator inverter 280, coupled to the output of the power supply 200 and the output rectifier 270, that regulates the output voltage Vout of the power supply 200.

The controller 220 monitors the output voltage Vout and drives the inverter 210 and the post-regulator inverter 280 to maintain the output voltage Vout at a substantially constant level.

In the illustrated embodiment, the inverter 210 includes first, second, third and fourth controllable switches $Q_A$, $Q_B$, $Q_C$, $Q_D$ arranged in a full-bridge topology. The primary winding T1p of the isolation transformer T1 is coupled between a first node 212 (between the first and second controllable switches $Q_A$, $Q_B$) and a second node 214 (between the third and fourth controllable switches $Q_C$, $Q_D$) of the inverter 210.

The output rectifier 270 includes first and second rectifying diodes D1, D2 arranged as a full wave rectifier. The first and second rectifying diodes D1, D2 are coupled to the secondary winding T1s of the isolation transformer T1 and receive the periodic waveform therefrom. The output rectifier 270 rectifies the periodic waveform to provide a rectified waveform to the output filter 275. Those skilled in the pertinent art are familiar with full-wave rectifiers and realize that other rectifier topologies, including those employing synchronous rectifiers, are well within the broad scope of the present invention.

The output filter 275 includes an output inductor Lout coupled to an output capacitor Cout. The output filter 275 receives the rectified waveform from the output rectifier 270 and smooths and filters the rectified waveform to maintain the output voltage Vout at a substantially constant level. Those skilled in the pertinent art are familiar with output filters. Of course, other filter topologies are well within the broad scope of the present invention.

The post-regulator inverter 280 includes a switching circuit 282 and a regulator transformer T2. In the illustrated embodiment, the switching circuit 282 includes fifth and sixth controllable switches $Q_E$, $Q_F$ coupled to the output of the power supply 200. The switching circuit 282 further includes first and second capacitors C1, C2 coupled across the fifth and sixth controllable switches $Q_E$, $Q_F$. While the switching circuit 282 illustrated and described has a half-bridge topology, those skilled in the pertinent art realize that other switching topologies are well within the broad scope of the present invention.

In the illustrated embodiment, the regulator transformer T2 has a primary winding T2p coupled between a third node 284 (between the fifth and sixth controllable switches $Q_E$, $Q_F$) and a fourth node 286 (between the first and second capacitors C1, C2) of the switching circuit 282. The regulator transformer T2 further has first and second secondary windings T2s1, T2s2 series-coupled between the secondary winding T1s of the isolation transformer T1 and the first and second rectifying diodes D1, D2, respectively. The switching circuit 282 receives the output voltage Vout from the power supply 200 and produces a phase-shifted waveform therefrom. The regulator transformer T2 then delivers the phase-shifted waveform to the output rectifier 270 to regulate the power supply 200. In the illustrated embodiment, the first and second rectifying diodes D1, D2 process power received from both the secondary winding T1s of the isolation transformer T1 and the respective first and second secondary windings T2s1, T2s2 of the regulator transformer T2.

In the illustrated embodiment, the post-regulator inverter 280 advantageously receives power from the output of the power supply 200 thus avoiding an additional path (i.e., the isolation transformer T1) for common-mode currents to flow between the input and output of the power supply 200. Further, by employing a switching circuit 282 that is, in the illustrated embodiment, separate from the inverter 210, the post-regulator inverter 280 of the present invention is able to perform both voltage addition and voltage subtraction (by adjusting the phase of its operation relative to the inverter 210), resulting in a generally lower power rating requirement for the post-regulator inverter 280. Additionally, by employing independent controllable switches for the inverter 210 and the post-regulator inverter 280, the input ripple current to the power supply 200 may be reduced, especially under nominal operating conditions.

In the illustrated embodiment, the controller 220 includes a first voltage scaling circuit 222, coupled to the output of the power supply 200, that receives the output voltage Vout and develops therefrom a scaled output signal Vsout1. The controller 220 further includes a signal generator circuit 226 coupled to the first voltage scaling circuit 222. In the illustrated embodiment, the signal generator circuit 226 is a pulse-width modulation circuit that receives the scaled output signal Vsout1 and a reference signal Vref1 and develops therefrom first, second, third and fourth pulse-width modulated drive signals at first, second, third and fourth signal generator circuit outputs A, B, C, D designed to respectively drive the first, second, third and fourth controllable switches $Q_A$, $Q_B$, $Q_C$, $Q_D$ of the inverter 210. Signal generator circuits are well known to those skilled in the pertinent art. See, e.g., the type 3875 control integrated circuit manufactured by Unitrode Integrated Circuits Corp. of Merrimac, N.H.

The controller 220 further includes a switching network 228 coupled to the signal generator circuit 226. The controller 220 further includes first, second and third gate drive transformers 230, 240, 250. In the illustrated embodiment, the first gate drive transformer 230 is coupled to the first and second controllable switches $Q_A$, $Q_B$ of the inverter 210. The second gate drive transformer 240 is coupled to the second and third controllable switches $Q_C$, $Q_D$ of the inverter 210. The third gate drive transformer 250 is coupled to the fifth and sixth controllable switches $Q_E$, $Q_F$ of the post-regulator inverter 280.

In the illustrated embodiment, the switching network 228 includes first, second, third and fourth bi-directional switches Q1, Q2, Q3, Q4. The first bi-directional switch Q1 is coupled between the first and fourth signal generator circuit outputs A, D. The second bi-directional switch Q2 is coupled between the second and third signal generator circuit outputs B, C. The third bi-directional switch Q3 is series-coupled between the fourth signal generator circuit output D and a first primary terminal 242 of the second gate drive transformer 240. The fourth bi-directional switch Q4 is series-coupled between the third signal generator circuit output C and a second primary terminal 244 of the second gate drive transformer 240.

In the illustrated embodiment, the first and second bi-directional switches Q1, Q2 are controlled by a logical control signal Q. The third and fourth bi-directional switches Q3, Q4 are controlled by an inverted logical control signal Q'. In the illustrated embodiment, the controller 220 includes a second voltage scaling circuit 223 coupled to the output of the power supply 200. The second voltage scaling circuit 223 receives the output voltage Vout and develops therefrom a second scaled output signal Vsout2. The controller 220 further includes a comparator circuit 224 coupled to the first voltage scaling circuit 222. The comparator circuit 224 receives the second scaled output signal Vsout2 and a second reference signal Vref2 and develops therefrom the logical control signal Q. The controller 220 still further includes an inverter 225 that receives the logical control signal Q and develops therefrom the inverted logical control signal Q'.

In the illustrated embodiment, the switching network 228 will switch to allow the signal generator circuit 226 to operate the inverter 210 in the normal mode when the logical control signal Q is high. Alternatively, when the logical control signal Q is low, the switching network 228 will switch to allow the signal generator circuit 210 to operate the inverter 210 in the phase-shifted mode.

Figure 3A:
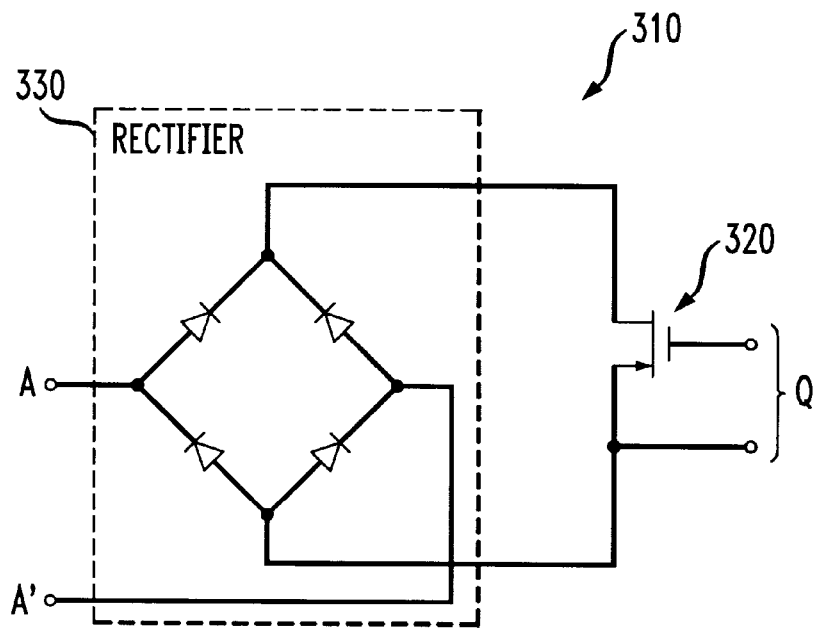
FIGS. 3A and 3B illustrate embodiments of bi-directional switches employable in the controller of the present invention.
Figure 3B:
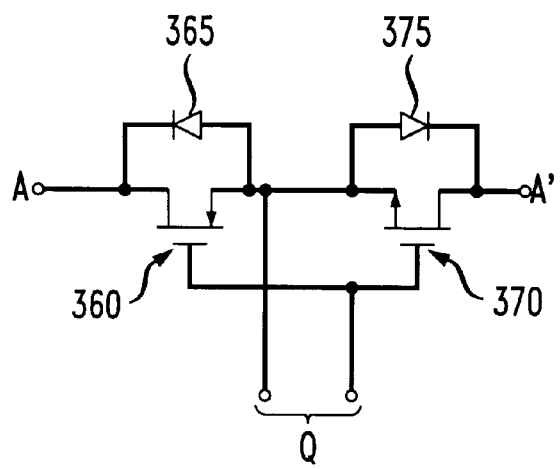

Turning now to FIGS. 3A and 3B, illustrated are embodiments of bi-directional switches employable in the controller of the present invention. More specifically, FIG. 3A illustrates a first bi-directional switch 310 implemented with a unidirectional switch 320 coupled to a rectifier 330. The arrangement of the diodes of the rectifier 330 allows the bi-directional switch 310 to conduct and block current in both directions. FIG. 3B illustrates a second bi-directional switch 350 implemented by coupling first and second unidirectional switches 360, 370 such that first and second diodes 365, 375, integral to the first and second unidirectional switches 360, 370, are facing in opposite directions. Of course, other implementations of bi-directional switches are possible and are well within the broad scope of the present invention.

Those skilled in the pertinent art should understand that the previously described embodiments of the power supply and controller are submitted for illustrative purposes only and other embodiments capable of switching the outputs of a signal generator circuit to allow the signal generator circuit to drive the controllable switches in both the phase-shifted mode and the normal mode are well within the broad scope of the present invention. Additionally, exemplary embodiments of the present invention have been illustrated with reference to specific electronic components. Those skilled in the pertinent art are aware, however, that components may be substituted (not necessarily with components of the same type) to create desired conditions or accomplish desired results. For instance, multiple components may be substituted for a single component and vice-versa. Also, the concepts of the present invention may be employed with other circuit topologies.

For a better understanding of power electronics, including power supplies and full bridge power converters, see *Power Electronics: Converters, Applications and Design*, by N. Mohan, T. M. Undeland and W. P. Robbins, John Wiley & Sons Publishing Company (1989) and *Unitrode Product & Applications Handbook*, pp. 6-348 to 6-361, by Unitrode, 7 Continental Blvd., Merrimack, N.H., 03054 (1995–1996), incorporated herein by reference.

Although the present invention has been described in detail, those skilled in the pertinent art should understand that they can make various changes, substitutions and alterations herein without departing from the spirit and scope of the invention in its broadest form.

What is claimed is:

1. For use with a full bridge power converter having controllable switches, a controller, comprising:

a signal generator circuit having outputs and designed to drive said controllable switches in a phase-shifted mode; and a switching network, coupled to said signal generator circuit, adapted to enable said signal generator circuit to operate said converter in an alternative one of:

said phase-shifted mode, wherein said switching network is configured to couple each of said outputs to a corresponding one of said controllable switches, said controllable switches in each of first and second legs of said converter being complementarily switched, said signal generator circuit capable of adjusting a relative phase between said first and second legs; and a normal mode, wherein said switching network is configured to couple only one pair of said outputs to said controllable switches, diagonal pairs of said controllable switches being switched substantially simultaneously and at a substantially full duty cycle.

2. The controller as recited in claim 1 wherein said signal generator circuit is embodied in an integrated circuit.

3. The controller as recited in claim 1 wherein said outputs are pulse-width modulated outputs employable to drive respective ones of said controllable switches.

4. The controller as recited in claim 1 wherein said switching network comprises at least one bi-directional switch.

5. The controller as recited in claim 1 wherein said converter is operated in said phase-shifted mode during start-up.

6. The controller as recited in claim 1 wherein said converter is operated in said phase-shifted mode during a fault condition.

7. The controller as recited in claim 1 further comprising at least one gate drive transformer coupled between said signal generator circuit and one of said controllable switches.

8. For use with a full bridge power converter having controllable switches, a method of controlling said controllable switches, comprising:

employing a signal generator circuit having outputs and designed to drive said controllable switches in a phase-shifted mode; and enabling said signal generator circuit to operate said converter in an alternative one of:

said phase-shifted mode, wherein each of said outputs are coupled to a corresponding one of said controllable switches, said controllable switches in each of first and second legs of said converter being complementarily switched, said signal generator circuit capable of adjusting a relative phase between said first and second legs; and a normal mode, wherein only one pair of said outputs is coupled to said controllable switches, diagonal pairs of said controllable switches being switched substantially simultaneously and at a substantially full duty cycle.

9. The method as recited in claim 8 wherein said signal generator circuit is embodied in an integrated circuit.

10. The method as recited in claim 8 wherein said outputs are pulse-width modulated outputs employable to drive respective ones of said controllable switches.

11. The method as recited in claim 8 wherein said enabling is performed by switching network comprising at least one bi-directional switch.

12. The method as recited in claim 8 wherein said converter is operated in said phase-shifted mode during start-up.

13. The method as recited in claim 8 wherein said converter is operated in said phase-shifted mode during a fault condition.

14. The method as recited in claim 8 further comprising coupling at least one gate drive transformer between said signal generator circuit and one of said controllable switches.

15. A power supply, comprising:

a full bridge inverter having controllable switches;

an isolation transformer having a primary winding coupled to said full bridge inverter;

a rectifier coupled to a secondary winding of said isolation transformer; and a controller, including:

a signal generator circuit having outputs and designed to drive said controllable switches in a phase-shifted mode, and a switching network, coupled to said signal generator circuit, adapted to enable said signal generator circuit to operate said inverter in an alternative one of:

said phase-shifted mode, wherein said switching network is configured to couple each of said outputs to a corresponding one of said controllable switches, said controllable switches in each of first and second legs of said inverter being complementarily switched, said signal generator circuit capable of adjusting a relative phase between said first and second legs, and a normal mode, wherein said switching network is configured to couple only one pair of said outputs to said controllable switches, diagonal pairs of said controllable switches being switched substantially simultaneously and at a substantially full duty cycle.

16. The power supply as recited in claim 15 wherein said signal generator circuit is embodied in an integrated circuit.

17. The power supply as recited in claim 15 wherein said outputs are pulse-width modulated outputs employable to drive respective ones of said controllable switches.

18. The power supply as recited in claim 15 wherein said switching network comprises at least one bi-directional switch.

19. The power supply as recited in claim 15 wherein said inverter is operated in said phase-shifted mode during start-up.

20. The power supply as recited in claim 15 wherein said inverter is operated in said phase-shifted mode during a fault condition.

21. The power supply as recited in claim 15 wherein said controller further comprises at least one gate drive transformer coupled between said signal generator circuit and one of said controllable switches.

* * * * *